United States Patent
Hammer et al.

(10) Patent No.: US 11,677,335 B2
(45) Date of Patent: Jun. 13, 2023

(54) METHOD FOR OPERATING A POWER CONVERTER

(71) Applicant: Siemens Energy Global GmbH & Co. KG, Munich (DE)

(72) Inventors: Stefan Hammer, Erlangen (DE); Volker Hussennether, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 178 days.

(21) Appl. No.: 17/272,414

(22) PCT Filed: Aug. 31, 2018

(86) PCT No.: PCT/EP2018/073455
§ 371 (c)(1),
(2) Date: Mar. 1, 2021

(87) PCT Pub. No.: WO2020/043304
PCT Pub. Date: Mar. 5, 2020

(65) Prior Publication Data
US 2021/0328521 A1    Oct. 21, 2021

(51) Int. Cl.
*H02M 7/757* (2006.01)
*H02M 7/483* (2007.01)
*H02M 1/00* (2006.01)

(52) U.S. Cl.
CPC ....... *H02M 7/7575* (2013.01); *H02M 7/4835* (2021.05); *H02M 1/0093* (2021.05); *H02M 1/0095* (2021.05)

(58) Field of Classification Search
CPC ............. H02M 1/0093; H02M 1/0095; H02M 7/4835; H02M 7/7575; Y02E 60/60
See application file for complete search history.

(56) References Cited

U.S. PATENT DOCUMENTS

| | | | |
|---|---|---|---|
| 2014/0092660 A1* | 4/2014 | Zhang | H02M 7/487 363/127 |
| 2014/0146582 A1* | 5/2014 | Gupta | H02M 7/7575 363/35 |

(Continued)

FOREIGN PATENT DOCUMENTS

| | | | | |
|---|---|---|---|---|
| EP | 3839999 A1 * | 6/2021 | | G05F 1/45 |
| WO | WO 2011134521 A1 | 11/2011 | | |

OTHER PUBLICATIONS

Bakas Panagiotis et al: "Hybrid topologies for series and shunt compensation of the line-commutated converter", 2016 IEEE 8th; International Power Electronics and Motion Control Conference (IPEMC-ECCE Asia), IEEE, pp. 3030-3035, XP032924766, DOI: 10.1109/IPEMC.2016.7512779; [gefunden am Jul. 13, 2016]; figure 1; paragraphs [00II], [0III]; 2016.

(Continued)

*Primary Examiner* — Fred E Finch, III
(74) *Attorney, Agent, or Firm* — Laurence A. Greenberg; Werner H. Stemer; Ralph E. Locher

(57) ABSTRACT

A method of operating a thyristor-based line-commutated multi-phase power converter on a multi-phase AC voltage connection point, which is supplied by an AC voltage network. Between the AC voltage connection point and an AC voltage connection of the power converter, a series circuit of modules is arranged for each phase. Each of the series circuits has a first electronic switching element, a second electronic switching element, and an electric energy storage device. The voltages of the phases of the AC voltage connection point are measured and, if an undervoltage is detected on a phase of the AC voltage connection point, an additional voltage adding to the voltage of that phase is generated by way of the series circuit of modules allocated (Continued)

to that phase in such a way that the voltage of that phase is increased, at least temporarily.

20 Claims, 5 Drawing Sheets

(56) References Cited

U.S. PATENT DOCUMENTS

| | | | | |
|---|---|---|---|---|
| 2015/0062991 A1* | 3/2015 | Zhang | ............... | H02M 7/5152 |
| | | | | 363/131 |
| 2015/0357941 A1* | 12/2015 | Oates | ............... | H02M 7/797 |
| | | | | 363/89 |
| 2016/0141949 A1* | 5/2016 | Zhang | ............... | H02M 7/487 |
| | | | | 363/78 |
| 2017/0214310 A1* | 7/2017 | Zhang | ............... | H02M 7/487 |
| 2018/0159421 A1* | 6/2018 | Zhang | ............... | H02M 7/7575 |
| 2020/0052611 A1* | 2/2020 | Zhang | ............... | H02M 7/5155 |

OTHER PUBLICATIONS

Panagiotis Bakas et al: "A Review of Hybrid Topologies Combining Line-Commutated and Cascaded Full-Bridge Converters", IEEE Transactions on Power Electronics, Institute of Electrical and Electronics Engineers, USA, vol. 32, No. 10, pp. 7435-7448, XP011648959, ISSN: 0885-8993, DOI: 10.1109/TPEL.2016.2631250; [gefunden am Apr. 10, 2017]; figures 1,4; 2017.

Gilsig T et al: "Artificial Commutation of Converters Through Injection Technique", IEEE Transactions on Power Apparatus and Systems, IEEE Inc. New York, US, vol. 82, No. 7, pp. 1052-1061, XP011160105, ISSN: 0018-9510; figures 1; paragraph [0001]; The Model Injection System Practical considerations; 1969.

CIGRE CE 14 Workshop, Power Transmission and Distribution Rio de Janeiro, Brasilia.

Toshihiko Tanaka et al: "An active-passive capacitor-commutated converter for HVDC systems with a three-phase voltage-source PWM converter", Electrical Engineering in Japan, vol. 151, No. 1, pp. 66-75, XP055586887, US; ISSN: 0424-7760, DOI: 10.1002/eej.20030; figures 2; 2005.

Tanaka T et al: "A New Approach to the Capacitor-Commutated Converter for HVDC—A Combined Commutation-Capacitor of Active and Passive Capacitors", Conference Proceedings, 2001 IEEE Power Engineering Society Winter Meeting, Columbus,OH,USA; [IEEE Power Engineering Society Winter Meeting], IEEE Operations Center, Piscataway, NJ, pp. 968-973, XP001042872, DOI: 10.1109/PESW.2001.917004; ISBN: 978-0-7803-6672-5; figure 2; 2001.

*PCT International Search Report and Written Opinion of International Searching Authority dated May 16, 2016 corresponding to PCT International Application No. PCT/EP2018/073455 filed Aug. 31, 2018.*

\* cited by examiner

METHOD FOR OPERATING A POWER CONVERTER

BACKGROUND OF THE INVENTION

Field of the Invention

The invention relates to a method for operating a thyristor-based line-commutated polyphase power converter on an AC-voltage grid and to an arrangement comprising such a power converter.

For successful commutation, thyristor-based power converters require an AC voltage to be provided by the AC-voltage grid, to be more precise a voltage-time integral. This property is emphasized by the term "line-commutated" (line-commutated converter, LCC). Occasionally, such power converters also need to be operated on weak AC-voltage grids, for example in the case of a line-commutated HVDC transmission. Weak AC-voltage grids (unstable AC-voltage grids) are AC-voltage grids in which per se harmless transient processes (such as, for example, the switching of an AC-voltage filter, the switching of a transformer tap changer or a change in the electrical power drawn from the AC-voltage grid) can result in a marked reduction in the magnitude of the AC voltage provided by the grid, in particular in a voltage dip. In the case of such AC-voltage grids, the characteristic variable effective short circuit ratio ESCR is often less than 2.5. As a result of the reduction in the amplitude of the AC voltage, in the case of the power converter connected to the AC-voltage grid, commutation errors and other instabilities can occur during operation. In the case of very weak grids (for example in the case of grids in which the characteristic variable ESCR is less than 2), it may arise that operation of the power converter is no longer possible at all.

SUMMARY OF THE INVENTION

The invention is based on the object of specifying a method and an arrangement with which a thyristor-based power converter can also be operated reliably on a weak AC-voltage grid.

This object is achieved according to the invention by a method and by an arrangement as claimed in the independent patent claims. Advantageous configurations of the method and the arrangement are specified in the dependent patent claims.

What is disclosed is: a method for operating a thyristor-based line-commutated polyphase power converter at a polyphase AC-voltage point of connection, which is supplied power (fed) from an AC-voltage grid, wherein a series circuit of modules is arranged per phase between the AC-voltage point of connection and an AC-voltage terminal of the power converter, said modules having in each case a first electronic switching element, a second electronic switching element and an electrical energy store, wherein, in the method,

- the voltages of the phases of the AC-voltage point of connection are measured (in particular for the purpose of regulating the voltages generated by the modules), and
- on identification of a low voltage (i.e. on identification of a voltage dip) on a phase of the AC-voltage point of connection, an additional voltage added to the voltage of the phase is generated by means of the series circuit of modules associated with this phase in such a way that the voltage of this phase is increased at least temporarily (piecewise). As a result, the low voltage or the voltage dip is substantially compensated for. Alternatively, in the case of a (current) commutation on a phase of the power converter, an additional voltage added to the voltage of the phase can be generated by means of the series circuit of modules associated with this phase in such a way that the voltage of this phase is increased at least temporarily. The sum of the voltage of the phase and the additional voltage is applied to the respective phase of the AC-voltage terminal of the power converter. As a result, safe commutation of the current into that power converter branch of the power converter which is associated with the phase is ensured. It is ensured that the rate of current change di/dt has the minimum value required for successful commutation (di/dt≈U).

The method can be configured in such a way that
- the power converter has a plurality of phase branches (which are each associated with a phase of the AC-voltage point of connection), and
- the additional voltage is generated at least during the commutation of a current into that phase branch of the power converter which is associated with this phase. As a result, the commutation of the current is assisted in a targeted manner by means of the additional voltage.

The method can be configured in such a way that, after conclusion of the commutation of the current, the additional voltage is disconnected (i.e. is set to zero). Then, a zero voltage is output by the series circuit of modules. After conclusion of the commutation, an additional voltage is no longer required in the respective phase, with the result that this additional voltage is disconnected. As a result, an energy saving is made. The conclusion of the commutation can be identified in particular by means of a current measurement, for example by means of a current measurement at the AC-voltage point of connection or on the phase branches of the power converter.

The method can be configured in such a way that the additional voltage is generated in such a way that the sum of the voltage of the phase and the additional voltage has a segment of a sinusoidal voltage characteristic. As a result, a situation is created as if the power converter were connected to a more stable AC-voltage grid in which no voltage dip (or a smaller voltage dip) occurs.

The method can proceed in such a way that a constant voltage is generated as additional voltage (during the commutation). Such a constant voltage can be generated particularly easily by means of the series circuit of the modules.

The method can also proceed in such a way that the additional voltage is generated in such a way that the charging and discharging (caused by the load current of the power converter) of the energy stores of the modules of the respective series circuit cancel one another out during a grid period. The modules are therefore advantageously driven in such a way that the additional voltage is generated in such a way. As a result, continued charging or discharging of the energy store(s) over a plurality of (grid) periods is to be avoided. In relation to the energy store, the modules can therefore be driven in such a way that the charging and discharging of the energy store resulting from the load current cancel one another out during a grid period in order to avoid continued charging or discharging of the energy store over a plurality of periods.

The method can also proceed in such a way that the reactive power consumption of the power converter is controlled by means of the additional voltage in such a way that, in the case of an increasing additional voltage, the reactive power consumption decreases, and, in the case of a decreasing additional voltage, the reactive power consumption increases. In this case, a decreasing reactive power consumption goes along with a higher commutation speed, an increasing reactive power consumption goes along with a lower commutation speed. As a result, it is additionally possible to influence the reactive power consumption of the power converter.

The method can also proceed in such a way that the power converter has a three-phase bridge circuit comprising six phase branches.

The method can proceed in such a way that two power converters are connected in series on the DC-voltage side, wherein the two power converters each have a 6-pulse bridge circuit. This results in a 12-pulse circuit.

The method can also proceed in such a way that a transformer is connected between the AC-voltage point of connection and the AC-voltage terminal of the power converter, and the at least one series circuit is arranged between the AC-voltage point of connection and the transformer (i.e. on the primary side of the transformer) or between the transformer and the AC-voltage terminal of the power converter (i.e. on the secondary side of the transformer). As a result, it is possible to be flexible in the choice of installation location for the modules of the series circuits.

The method can proceed in such a way that
the series circuits have modules, in the case of which the first electronic switching element and the second electronic switching element are arranged in a half-bridge circuit, and/or
the series circuits have modules, which (additionally) each have a third electronic switching element and a fourth electronic switching element, wherein the first electronic switching element, the second electronic switching element, the third electronic switching element and the fourth electronic switching element are arranged in a full-bridge circuit. Such modules are also referred to as half-bridge modules and as full-bridge modules, respectively.

The method can also proceed in such a way that
in the case of series circuits of modules in the case of which in each case the first electronic switching element and the second electronic switching element are arranged in a half-bridge circuit, the additional voltage is generated in the case of a commutation by means of one of the series circuits in only one phase, or
in the case of series circuits of modules in the case of which in each case the first electronic switching element, the second electronic switching element, the third electronic switching element and the fourth electronic switching element are arranged in a full-bridge circuit, in each case an additional voltage is generated in the case of a commutation by means of two of the series circuits in two phases.

In the case of the second alternative, the two additional voltages can in particular have an opposite polarity, with the result that the voltage difference between the two phases is increased. With full-bridge modules it is advantageously possible to generate an additional voltage with a positive or with a negative polarity. It is thus possible with two additional voltages of a low amplitude but opposite polarity to generate a voltage difference between the two phases involved in the commutation which is twice as great as each of the two additional voltages when considered alone. As a result, fewer modules are required in the series circuit in the case of full-bridge modules than in the case of half-bridge modules.

What is furthermore disclosed is: an arrangement comprising a thyristor-based line-commutated polyphase power converter having a polyphase AC-voltage terminal, wherein each phase of the AC-voltage terminal is connected via in each case one series circuit of modules to a polyphase AC-voltage point of connection for an AC-voltage grid, wherein each module has a first electronic switching element, a second electronic switching element and an electrical energy store, comprising a measuring device for measuring the voltage present at the AC-voltage point of connection, and comprising a control device, which is designed
to drive, on identification of a low voltage (in particular a voltage dip) on a phase of the AC-voltage point of connection, the series circuit of modules associated with this phase in such a way that the modules generate an additional voltage added to the voltage of the AC-voltage point of connection in such a way that the voltage of this phase is increased at least temporarily (piecewise). Alternatively, the control device can be designed to drive, in the case of a (current) commutation on a phase of the power converter, the series circuit of modules associated with this phase in such a way that the modules generate an additional voltage added to the voltage of the AC-voltage point of connection in such a way that the voltage of this phase is increased at least temporarily.

This arrangement can be configured in such a way that
the power converter has a plurality of phase branches (which are each associated with a phase of the AC-voltage point of connection), and that
that the control device is designed to drive the modules of the series circuit in such a way that the modules generate the additional voltage at least during the commutation of a current into that phase branch of the power converter which is associated with this phase.

The arrangement can also be configured in such a way that the control device is designed to drive the modules of the series circuit in such a way that the modules disconnect (i.e. set to zero) the additional voltage after conclusion of the commutation of the current.

The control device can be designed to drive the modules of the series circuit in such a way that the sum of the voltage of the phase and the additional voltage has a segment of a sinusoidal voltage characteristic.

The control device can be designed to drive the modules of the series circuit in such a way that the modules generate a constant voltage as additional voltage (during the commutation).

The control device can also be designed to drive the modules of the series circuit in such a way that the modules control the reactive power consumption of the power converter by means of the additional voltage in such a way that, in the case of an increasing additional voltage, the reactive power consumption decreases, and, in the case of a decreasing additional voltage, the reactive power consumption increases. In this case, a lower reactive power consumption goes along with a higher commutation speed; a higher reactive power consumption goes along with a lower commutation speed.

The control device can be designed to drive the modules of the series circuit(s) in such a way that
in the case of series circuits of modules in the case of which in each case the first electronic switching element and the second electronic switching element are arranged in a half-bridge circuit, the modules of one of the series circuits in only one phase generate the additional voltage per commutation, or in the case of series circuits of modules in the case of which in each case the first electronic switching element, the second electronic switching element, the third electronic switching element and the fourth electronic switching element are arranged in a full-bridge circuit, the modules of two of the series circuits in two phases in each case generate an additional voltage per commutation. In this case, the two additional voltages can in particular have an opposite polarity, with the result that the voltage difference between the two phases is increased.

The described method and the described arrangement have identical or similar advantages.

In the text which follows, the invention will be explained in more detail with reference to exemplary embodiments. Identical reference symbols in this case relate to identical or functionally identical elements.

DETAILED DESCRIPTION OF THE INVENTION

Figure 1:
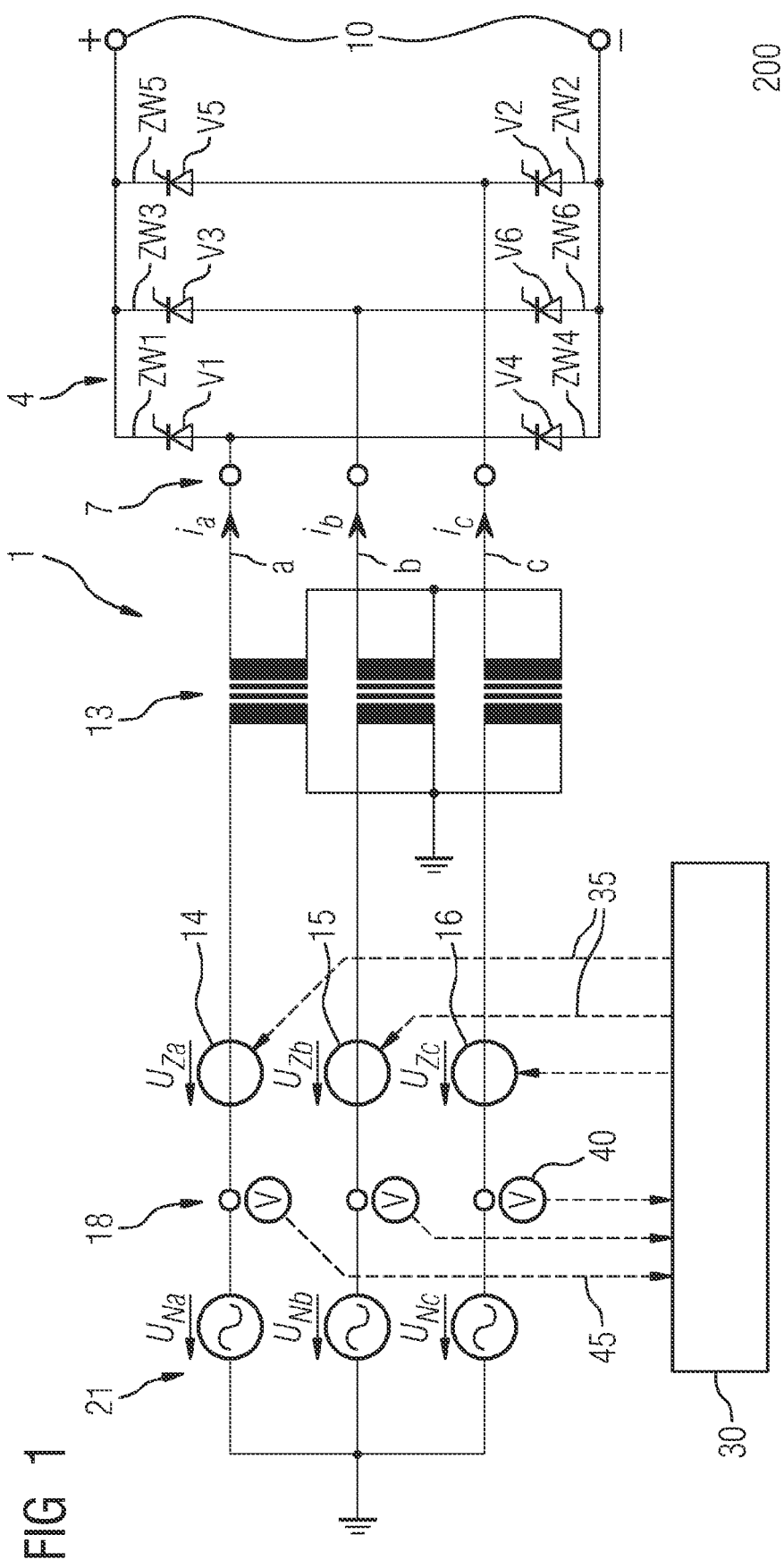
FIG. 1 shows an exemplary embodiment of an arrangement comprising a thyristor-based line-commutated power converter.

FIG. 1 shows an exemplary embodiment of an arrangement 1 comprising a power converter 4. The power converter 4 in the exemplary embodiment is a thyristor-based power converter (thyristor power converter) which is a line-commutated and polyphase. The power converter 4 has an AC-voltage terminal 7 and a DC-voltage terminal 10. The AC-voltage terminal 7 is connected to the secondary side of a polyphase transformer 13. The polyphase primary side of the transformer 13 is connected to a polyphase AC-voltage point of connection 18 via a first series circuit 14 of modules, a second series circuit 15 of modules and a third series circuit 16 of modules. The AC-voltage point of connection 18 is electrically connected to a polyphase AC-voltage grid 21. Symbolically only three AC-voltage sources of the AC-voltage grid 21 are illustrated, which sources provide the three phase voltages UNa, UNb and UNc of the AC-voltage grid. The three symbolic voltage sources of the AC-voltage grid 21 are arranged electrically in a star circuit, wherein the neutral point is grounded.

In the exemplary embodiment, the entire arrangement has a three-phase configuration, i.e. both the power converter 4, the AC-voltage terminal 7, the transformer 13, the AC-voltage point of connection 18 and the AC-voltage grid 21 each have three phases. The first phase of the arrangement is denoted by a, the second phase of the arrangement is denoted by b, and the third phase of the arrangement is denoted by c. In another exemplary embodiment, however, the arrangement can also have a different number of phases, for example two phases.

The first series circuit 14 of modules generates the first additional voltage UZa. The first additional voltage UZa is added to the first phase voltage UNa of the AC-voltage grid 21 (which is present on the first phase a of the AC-voltage point of connection 18). In the same way, the second series circuit 15 of modules generates the second additional voltage UZb for the second phase b of the AC-voltage grid 21 (which is present on the second phase b of the AC-voltage point of connection 18). The third series circuit 16 of modules generates the third additional voltage UZc for the third phase c. The series circuits each represent an additional voltage source, which generates the respective additional voltage.

The power converter 4 has a plurality of phase branches. In the exemplary embodiment, the power converter 4 has a three-phase bridge circuit comprising six phase branches ZW1 to ZW6. An electrical valve V1 to V6 is arranged in each phase branch ZW1 to ZW6. In this case, each valve Vn is in the form of a thyristor (or in the form of a series circuit comprising a plurality of thyristors).

At the AC-voltage terminal 7, three phase currents ia, ib and ic flow into the power converter 4. These phase currents ia, ib and ic are provided by the secondary windings of the transformer 13. In the case of the transformer 13, the secondary windings and the primary windings are each star-connected. The neutral point of the primary windings is grounded. The three primary windings of the transformer 13 are each electrically connected to one of the phases of the AC-voltage point of connection 18 via one of the series circuits 14, 15 or 16. The series circuits 14, 15 or 16 are illustrated here symbolically merely as a circle. The configuration of the series circuit of modules is illustrated by way of example in the following figure. In another exemplary embodiment, however, the transformer 13 can also have a different configuration. For example, the primary and secondary windings of the transformer 13 can also each be delta-connected, or the primary windings can be star-connected and the secondary windings can be delta-connected.

A control device 30 drives the modules of the series circuits 14, 15 and 16 by means of control signals 35. Each module can be driven by means of these control signals 35 in such a way that said module outputs a desired (output) voltage. The sum of the voltages of the modules of the series circuit gives the additional voltage UZ.

During operation of the power converter 4, the current provided at the DC-voltage terminal 10 of the power converter 4 commutates, depending on the instantaneous value of the voltages of the individual phases which are present at the AC-voltage terminal 7, one after the other from one phase branch into the next phase branch. For example, the current to be output at the DC-voltage terminal 10 commutates from the first phase branch ZW1 into the third phase branch ZW3 and flows, via the second phase branch ZW2, back to the AC-voltage terminal 7 of the power converter. For example, for this commutation from the first phase branch ZW1 into the third phase branch ZW3, there must be a sufficiently high voltage available in the phase b of the AC-voltage terminal 7 in order for the commutation to proceed successfully.

The voltages of the phases of the AC-voltage point of connection 18 are measured by means of voltage-measuring devices 40. The voltage measured values produced in the process are transmitted to the control device 30 by means of voltage measurement signals 45. If, owing to a sudden occurrence (for example owing to a change in load), the voltage of the polyphase AC-voltage grid 21 is suddenly reduced (for example voltage dip on the phase b of the AC-voltage grid 21), the control device 30 identifies the occurrence of this low voltage by means of the voltage measurement at the AC-voltage point of connection 18. Thereupon, the control device 30 drives the modules of the second series circuit 15 by means of the control signals 35 in such a way that said modules of the second series circuit 15 generate an additional voltage UZb.

The additional voltage UZb generated by means of the second series circuit 15 is added to the voltage UNb of the phase b. As a result, the sum of the voltage UNb of the AC-voltage grid 21 and the additional voltage UZb is applied to the phase b of the AC-voltage terminal 7 of the power converter 4. As a result, the voltage of the phase b at the AC-voltage terminal 7 of the power converter 4 is increased (at least temporarily during the commutation). As a result, the low voltage of the phase b or the voltage dip on the phase b of the AC-voltage grid 21 is partially or completely compensated for. This means that proper commutation is possible even on the phase b originally having a low voltage.

The control device 30 can in particular drive the modules of the series circuit 15 in such a way that the additional voltage is only generated during the commutation of the current into the phase branch belonging to this phase (in this case: into the phase branch ZW3). The additional voltage can, however, also be generated for longer. Optionally, the additional voltage can also be generated in such a way that the magnitude of the additional voltage is dependent on the magnitude of the low voltage of the phase. In this case, the additional voltage can in particular be proportional to the magnitude of the low voltage of the phase.

In the exemplary embodiment in FIG. 1, the series circuits of modules (which represent additional voltage sources) are arranged between the AC-voltage point of connection 18 and the transformer 13 (more precisely between the AC-voltage point of connection 18 and the primary windings of the transformer 13). The series circuits are therefore arranged on the primary side of the transformer and are electrically connected to the primary windings. In another exemplary embodiment, these series circuits can also, however, be arranged between the transformer 13 and the AC-voltage terminal 7 of the power converter 4 (i.e. on the secondary side of the transformer 13). In this case, the series circuits are electrically connected to the secondary windings of the transformer 13.

Figure 2:
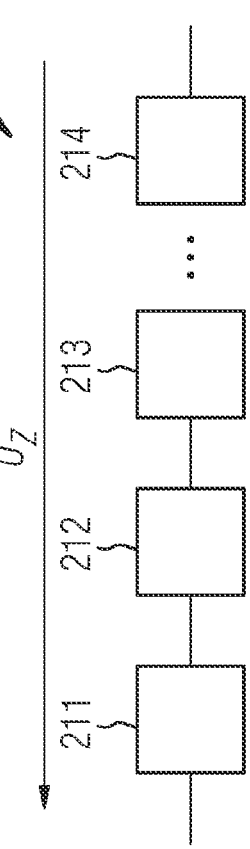
FIG. 2 shows an exemplary embodiment of a series circuit of modules.

FIG. 2 illustrates an exemplary embodiment of a series circuit 200 of modules. This series circuit may be the first series circuit 14, the second series circuit 15 or the third series circuit 16. The series circuit has n modules; in FIG. 2, a first module 211, a second module 212, a third module 213 and an nth module 214 are illustrated. In this case, n may be, for example, 8, 16 or 32. n can, however, also assume greater values, for example 50 or 100. The additional voltage UZ which is provided by the modules of the series circuit occurs over the series circuit 200. In this case, the voltages of the individual modules of the series circuit add up to give the additional voltage UZ.

Figure 3:
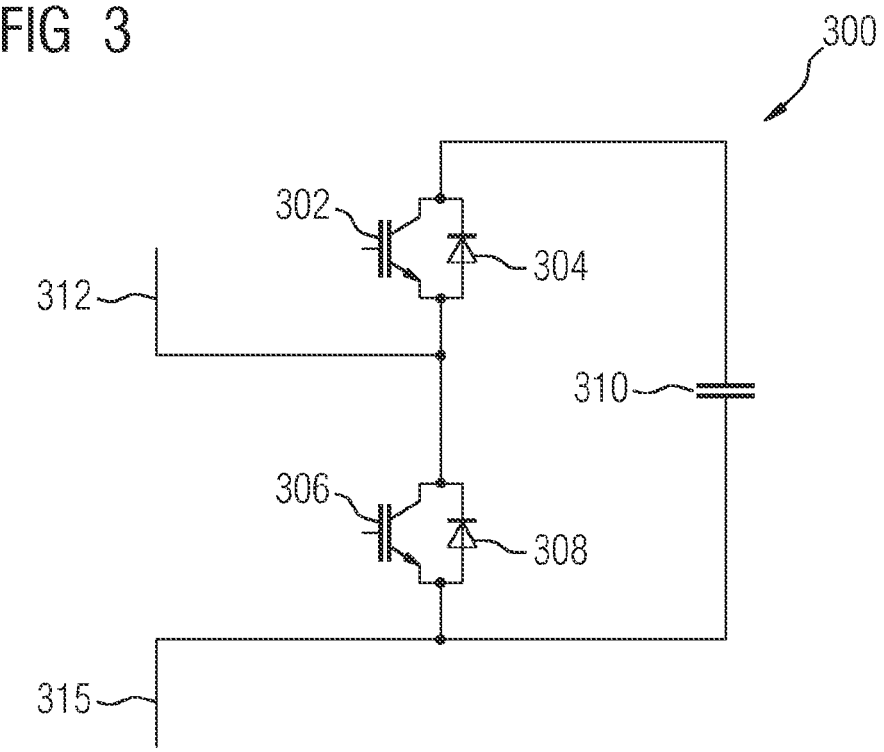
FIG. 3 shows an exemplary embodiment of a module of the series circuit.

FIG. 3 illustrates an exemplary embodiment of a module 300 of the series circuit. The module 300 may be, for example, the first module 211 or one of the other modules of the series circuit.

The module 300 is configured as a half-bridge module 300. The module 300 has a first (turn-off) electronic switching element 302 (first turn-off semiconductor valve 302) having a first diode 304 connected back-to-back in parallel. Furthermore, the module 300 has a second (turn-off) electronic switching element 306 (second turn-off semiconductor valve 306) having a second diode 308 connected back-to-back in parallel and an electrical energy store 310 in the form of a capacitor 310. The first electronic switching element 302 and the second electronic switching element 306 are each configured as an IGBT (insulated-gate bipolar transistor). The first electronic switching element 302 is connected electrically in series with the second electronic switching element 306. A first module terminal 312 is arranged at the node between the two electronic switching elements 302 and 306. A second module terminal 315 is arranged at that terminal of the second electronic switching element 306 which is opposite the node. The second module terminal 315 is furthermore electrically connected to a first terminal of the energy store 310; a second terminal of the energy store 310 is electrically connected to that terminal of the first electronic switching element 302 which is opposite the node.

The energy store 310 is therefore connected electrically in parallel with the series circuit comprising the first electronic switching element 302 and the second electronic switching element 306. By corresponding driving of the first electronic switching element 302 and the second electronic switching element 306 by a control device of the power converter, it is possible to achieve a situation whereby either the voltage of the energy store 310 is output or no voltage is output (i.e. a zero voltage is output) between the first module terminal 312 and the second module terminal 315. By virtue of the interaction of the modules of the individual series circuits, the respectively desired additional voltage UZ can thus be generated.

Figure 4:
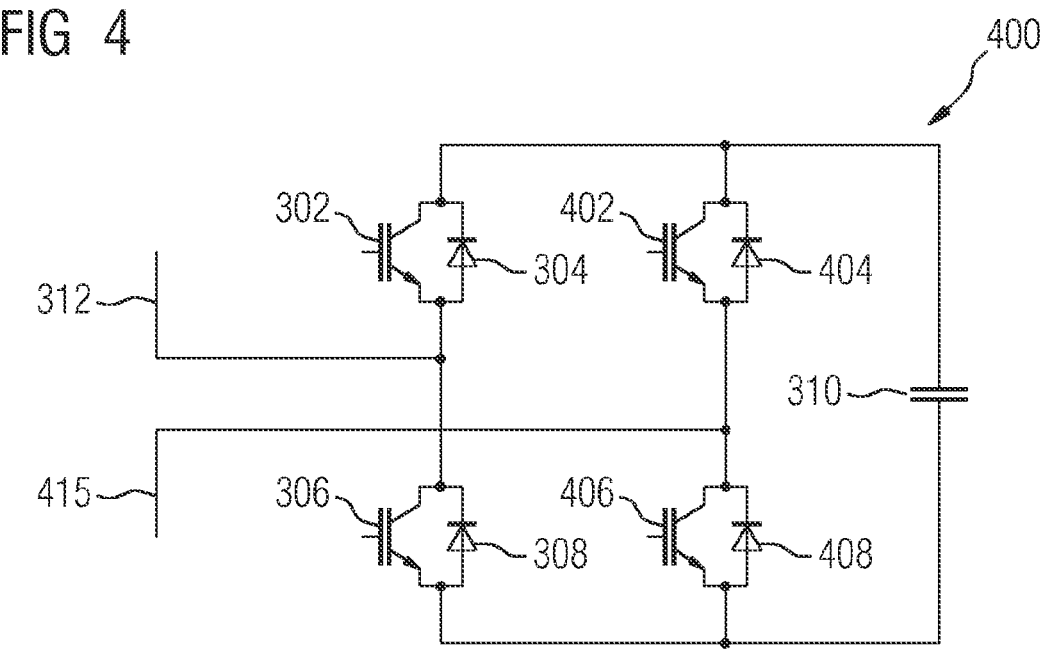
FIG. 4 shows a further exemplary embodiment of a module of the series circuit.

FIG. 4 shows a further exemplary embodiment of a module 400 of the series circuit. This module 400 may be, for example, the first module 211 or one of the other modules of the series circuit.

In addition to the first electronic switching element 302, second electronic switching element 306, first freewheeling diode 304, second freewheeling diode 308 and energy store 310 known already from FIG. 3, the module 400 has a third electronic switching element 402 having a third freewheeling diode 404 connected back-to-back in parallel and a fourth electronic switching element 406 having a fourth freewheeling diode 408 connected back-to-back in parallel. The third electronic switching element 402 and the fourth electronic switching element 406 are each configured as an IGBT. In contrast to the circuit shown in FIG. 3, the second module terminal 415 is not electrically connected to the second electronic switching element 306, but to a center point (node) of an electrical series circuit comprising the third electronic switching element 402 and the fourth electronic switching element 406.

The module 400 is a so-called full-bridge module 400. This full-bridge module 400 is characterized by the fact that, given corresponding driving of the four electronic switching elements, optionally either the positive voltage of the energy store 310, the negative voltage of the energy store 310 or a voltage of the value zero (zero voltage) can be output between the first (galvanic) module terminal 312 and the second (galvanic) module terminal 415. Therefore, the polarity of the output voltage can thus be reversed by means of the full-bridge module 400.

Figure 5:
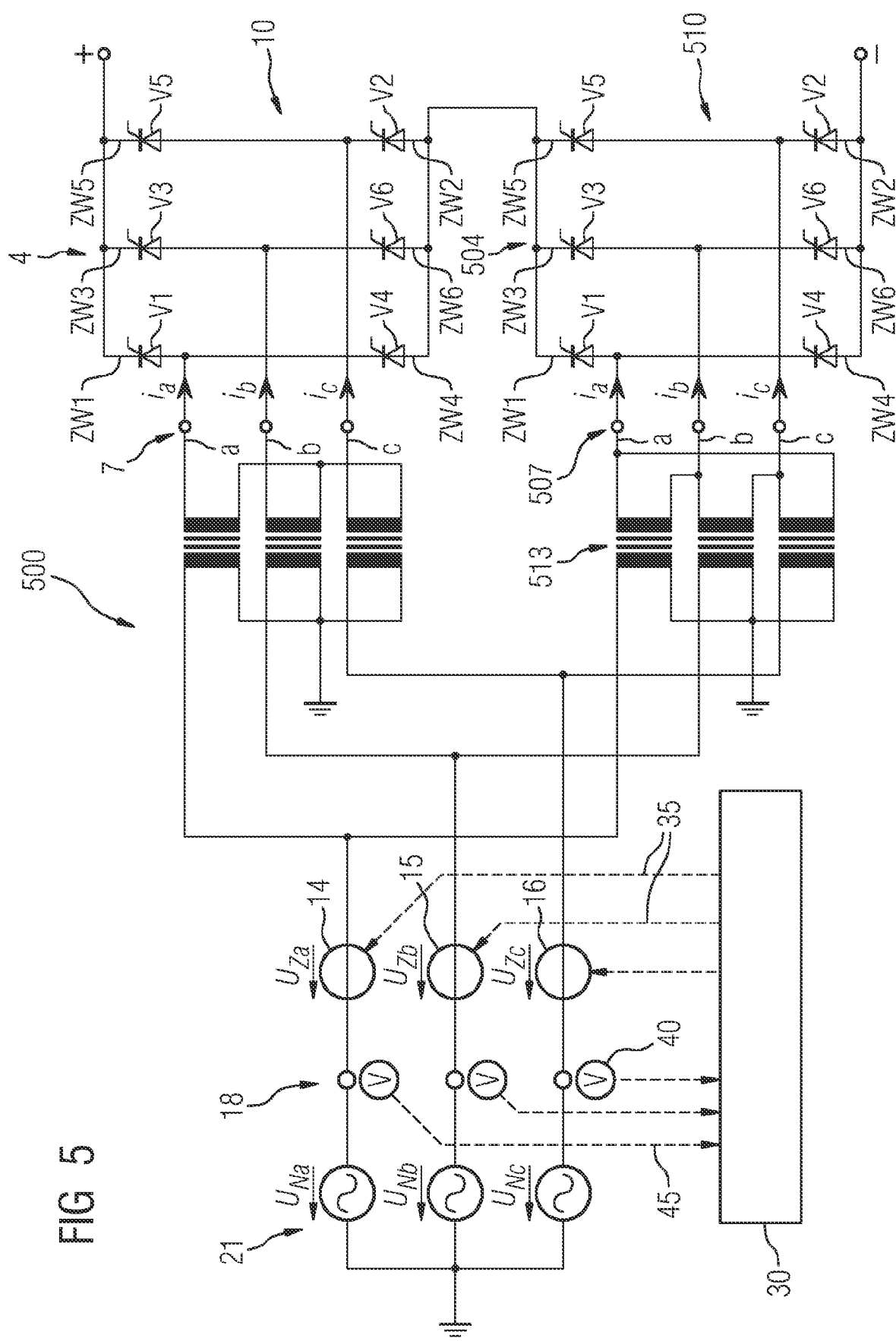
FIG. 5 shows a further exemplary embodiment of an arrangement comprising a thyristor-based line-commutated power converter.

FIG. 5 shows a further exemplary embodiment of an arrangement 500 comprising the power converter 4 and a further power converter 504. In this case, the further power converter 504 is electrically connected to the series circuits 14, 15 and 16 of modules via a further AC-voltage terminal 507 and a further transformer 513.

In this case, the primary windings of the further transformer 513 are star-connected, and the secondary windings of the further transformer 513 are delta-connected.

The primary windings of the transformer 13 and the primary windings of the further transformer 513 are each connected in parallel and electrically connected to the AC-voltage point of connection 18 via the series circuits 14, 15 and 16 of modules. The DC-voltage terminal 10 of the power converter 4 is connected electrically in series with a DC-voltage terminal 510 of the further power converter 504. The power converter 4 and the further power converter 504 have a similar design. Each of these power converters has a 6-pulse bridge circuit (6-pulse thyristor bridge circuit). Owing to the fact that the two power converters are connected in series, a 12-pulse circuit results, with the advantage of less ripple of the DC voltage.

Figure 6:
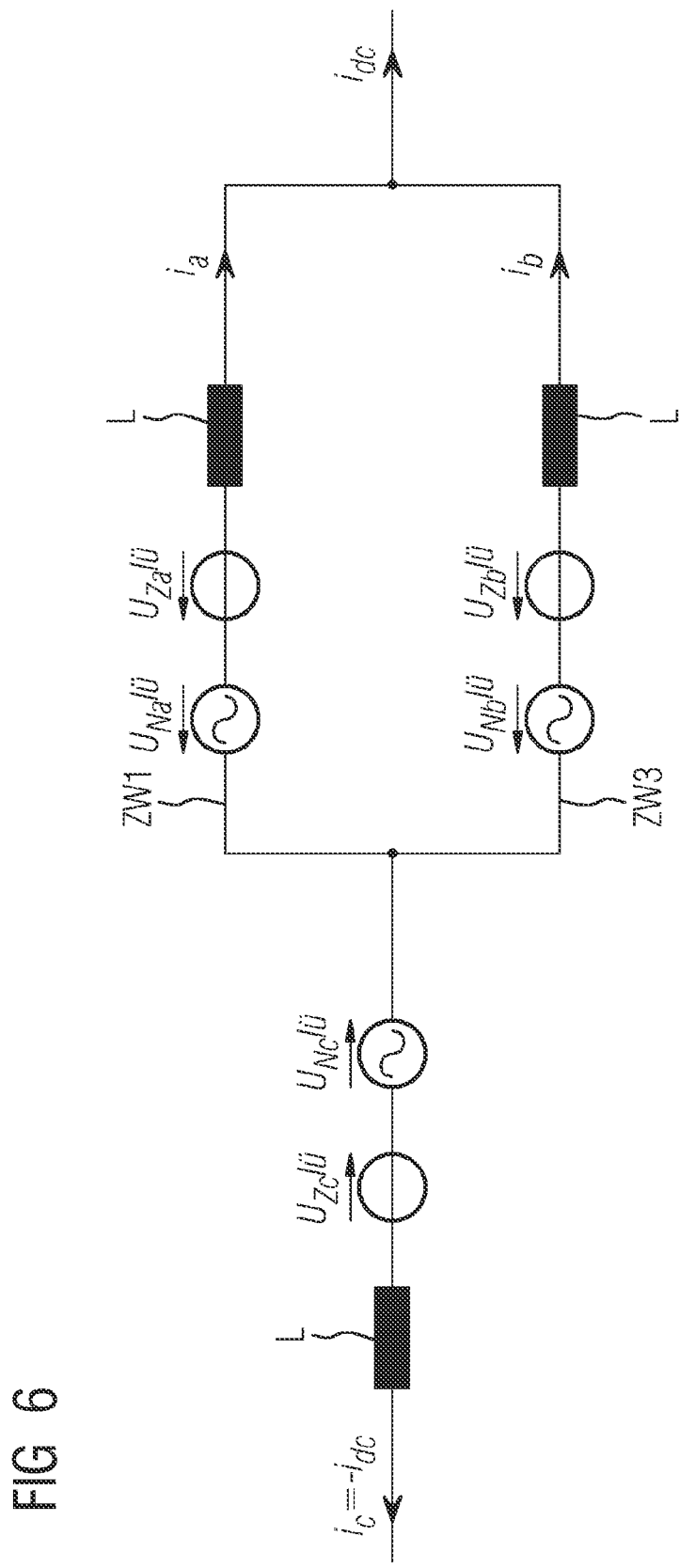
FIG. 6 shows an exemplary illustration of the commutation process from one phase branch of the power converter into another phase branch.

FIG. 6 shows an exemplary model for the commutation of the current from the phase branch ZW1 into the phase branch ZW3 of the power converter 4. This model applies in particular in the case of the transformer 13 connected with a double star configuration. The following relationships apply in the case of the commutation circuit illustrated:

$$di_{dc}/dt = di_c/dt = 0$$

$$di_b/dt = -di_a/dt$$

This gives $$di_b/dt = (U_{Nb} - U_{Na} + U_{Zb} - U_{Za})/(2L\ddot{u})$$

Here,
$i_{dc}$ is the direct current provided by the power converter 4,
$i_a$ is the alternating current of the phase a flowing into the power converter 4,
$i_b$ is the alternating current of the phase b flowing into the power converter 4,
$i_c$ is the alternating current of the phase c flowing into the power converter 4,
$U_{Na}$ is the voltage of the phase a of the AC-voltage grid 21,
$U_{Nb}$ is the voltage of the phase b of the AC-voltage grid 21,
$U_{Za}$ is the additional voltage generated in the phase a,
$U_{Zb}$ is the additional voltage generated in the phase b,
L is the effective inductance in the commutation circuit (in particular the inductance of the transformer 13), and
ü is the transformation ratio of the transformer 13.

Figure 7:
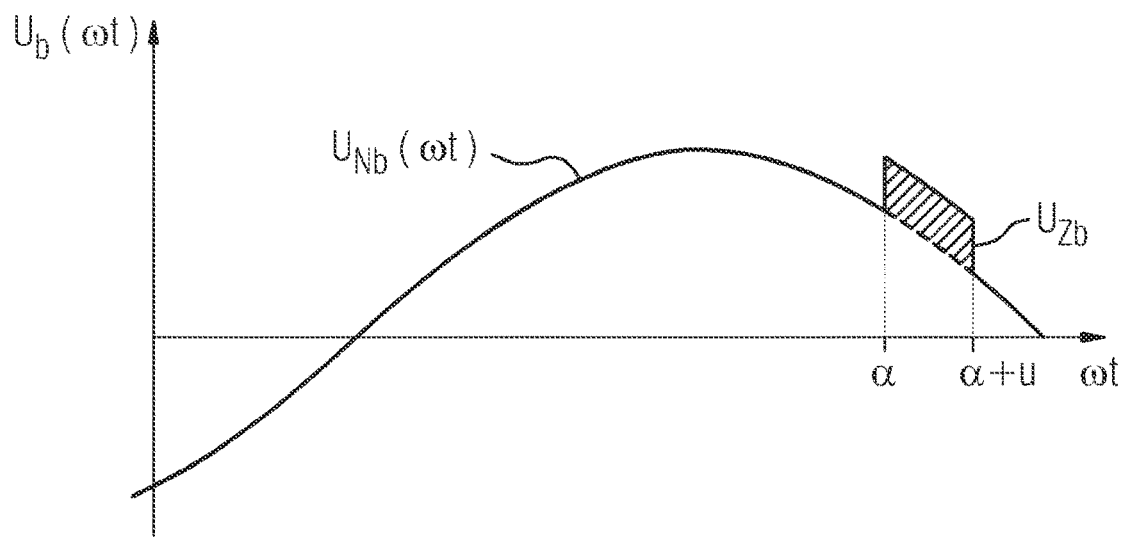
FIG. 7 shows an exemplary voltage characteristic on a phase of the AC-voltage terminal of the power converter.

FIG. 7 shows an exemplary voltage characteristic on the phase b of the power converter 4 as a function of the angle ωt. In this case, the voltage of the phase b of the AC-voltage grid 21, as it occurs and is measured at the AC-voltage point of connection 18, is illustrated as a voltage UNb (ωt) having a sinusoidal characteristic. In the exemplary embodiment, it is assumed that this voltage has collapsed, i.e. has values which are too low, owing to a severe load on the phase of the AC-voltage grid 21.

The commutation of the current into the phase b takes place between the angles α and α+u. Therefore, the additional voltage UZb is generated between the angles α and α+u. The additional voltage UZb is added to the phase voltage UNb of the AC-voltage grid 21. As a result, in the region between α and α+u, the AC voltage of the phase b present at the power converter 4 is significantly increased, as is illustrated in FIG. 7 by the hatched area. Owing to the increased voltage at the time of the commutation, the commutation into the phase b proceeds without any faults. After conclusion of the commutation (i.e. after the time angle α+u), the additional voltage UZb is disconnected because it is no longer required. Likewise, the additional voltage UZb is disconnected prior to the beginning of the commutation (i.e. before the angle α). The additional voltage is only switched on and therefore effective in the time period of the commutation, in particular during the commutation (i.e. between the angles α and α+u). In another exemplary embodiment, the additional voltage UZb can also be generated continuously, however, i.e. throughout the period of the grid voltage UNb(ωt).

It can be seen clearly from FIG. 7 that a constant voltage is generated as additional voltage UZb during the commutation, which constant voltage is added to the voltage UNb of the phase. The sum of the voltage of the phase UNb and the additional voltage UZb has a sinusoidal voltage characteristic, to be more precise a segment of a sinusoidal voltage characteristic.

Therefore, the additional voltage UZb and thus the additional voltage-time integral illustrated by hatching, which ensures fault-free commutation, is provided by means of the modules of the second series circuit 15 in the phase b.

Figure 8:
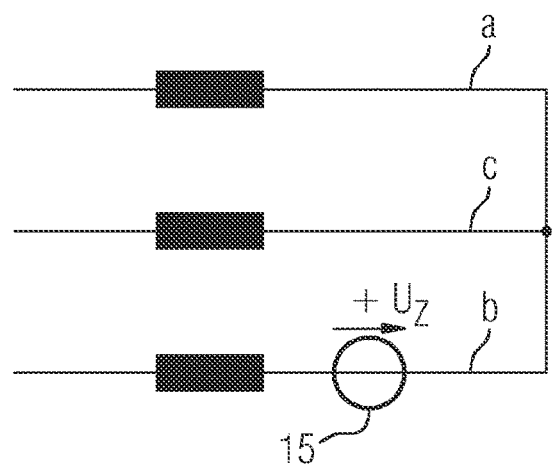
FIG. 8 shows an exemplary schematic illustration of the generation of the additional voltage by means of a series circuit of half-bridge modules.

FIG. 8 shows an exemplary embodiment for generation of the additional voltage UZ by means of a series circuit of half-bridge modules. It can be seen that the additional voltage UZ is provided by means of a series circuit of half-bridge modules only in one phase (by way of example here, in the phase b). The additional voltage UZ here has a polarity defined as positive and a magnitude defined as 1. The additional voltage is therefore +UZ. In the other two phases (in this case: in the phases a and c), no additional voltage is generated (UZa=UZc=zero). In the following figure, it is illustrated by way of example how additional voltages are generated when series circuits comprising full-bridge modules are used for the additional voltage generation.

Figure 9:
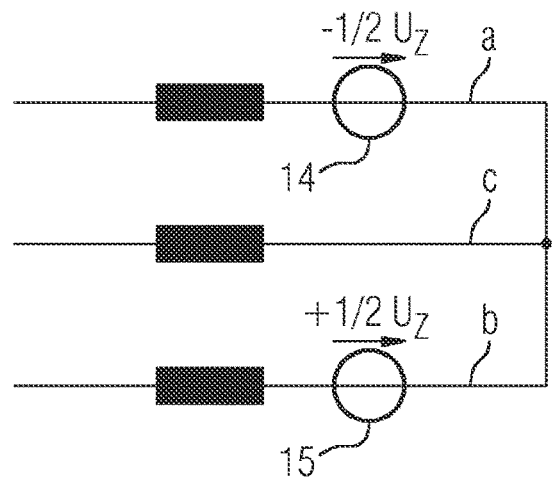
FIG. 9 shows an exemplary schematic illustration of the generation of the additional voltage by means of two series circuits of full-bridge modules.

FIG. 9 illustrates an exemplary embodiment for generation of additional voltages by means of series circuits of full-bridge modules. It can be seen that, in two phases of the three-phase system (in this case: in the phases a and b), in each case an additional voltage is generated by in each case one series circuit of full-bridge modules. In this case, the voltage (−½ UZ) is generated in the phase a by means of the one series circuit 14 of full-bridge modules. The additional voltage (+½ UZ) is generated in the other phase b by means of the other series circuit 15 of full-bridge modules. In the third phase (in this case: in the phase c), no additional voltage is generated (UZc=zero). This is possible because both positive and negative voltages can be provided by means of full-bridge modules. In contrast to this, only voltages of one polarity can be provided by means of half-bridge modules. The use of full-bridge modules for the series circuits has the advantage that each series circuit only needs to provide a lower additional voltage UZ. As a result, in each case also only a lower number of series-connected modules is required for the series circuits, which saves on costs and installation space.

The following table illustrates, by way of example, the phases of the power converter for which additional voltages are provided in the case of the various commutations by means of series circuits of full-bridge modules. In this case, the designation "123" represents the commutation from the first phase branch ZW1 into the third phase branch ZW3 in the case of continued current transport via the second phase branch ZW2. The designation "234" represents the commutation from the second phase branch ZW2 into the fourth phase branch ZW4 in the case of continued current transport via the third phase branch ZW3, etc. The entry "+UZ" means that the respective series circuit provides a positive additional voltage UZ. The entry "−UZ" means that the respective series circuit provides a negative additional voltage UZ. The entry "0" means that the respective series circuit provides no voltage as additional voltage (i.e. a voltage of the magnitude zero, i.e. a zero voltage). It can be seen once again here that, when using series circuits with full-bridge modules, in the case of each commutation into two phases, two additional voltages of opposite polarity are generated. In the third phase, a zero voltage is generated as additional voltage. For each phase (i.e. for each additional voltage) it can be seen that the positive and negative additional voltages cancel one another out over all of the commutations in a grid period. As a result, continuing charging or discharging of the energy store or the energy stores of the modules of the series circuits over a plurality of grid periods is avoided.

| Commutation | Additional voltage UZa | Additional voltage UZb | Additional voltage UZc |
| --- | --- | --- | --- |
| 123 | −UZ | +UZ | 0 |
| 234 | −UZ | 0 | +UZ |
| 345 | 0 | −UZ | +UZ |
| 456 | +UZ | −UZ | 0 |
| 561 | +UZ | 0 | −UZ |
| 612 | 0 | +UZ | −UZ |

The reactive power consumption of the power converter (consumption of reactive power Q, reactive power requirement of the power converter) can also be controlled by means of the additional voltage UZ. The higher the additional voltage UZ is, the lower the reactive power consumption of the power converter is. In the case of a decreasing additional voltage UZ, the reactive power consumption of the power converter increases. In this case, a decreasing reactive power consumption goes along with a greater commutation speed. An increasing reactive power consumption goes along with a decreasing commutation speed. It is therefore possible to set either a quick commutation with a low reactive power consumption of the power converter or a slow commutation with a high reactive power consumption of the power converter.

A method and an arrangement have been described with which a thyristor-based line-commutated power converter can also be operated on a weak AC-voltage grid. Advantageously, in this case, despite the weak/unstable AC-voltage grid, the commutation processes in the phase branches of the thyristor power converter are performed without faults.

Modules which are connected in series with the thyristor-based power converter and which form in each case a series circuit in each phase are used. The commutation process of the power converter is assisted by the targeted provision of voltage-time integrals. Half-bridge modules or full-bridge modules can be used as the modules. The modules are switched on and off in a targeted manner by means of the control device, with the result that the voltage or voltage-time integral required for the commutation is provided in a targeted manner.

In this case, it is advantageous that only a comparatively low number of modules for the series circuit are required for the method and the arrangement. With the modules, it is namely only necessary for the voltage dip of the weak grid to be compensated for. As a result, the described arrangement and the described method can be realized inexpensively.

In the method and in the arrangement, the lack of voltage-time integrals which is the cause of the occurrence of commutation faults is compensated for. As a result, a very effective possibility of operating thyristor power converters on weak grids is provided. Owing to the capacity of the switching elements (in particular IGBTs) of the modules to switch off, in the event of the occurrence of faults (for example short circuits), the discharge of the energy stores (which can in particular be in the form of capacitors) into the point of the fault can be avoided. Therefore, the arrangement and the method can also advantageously be used in installations with overhead line transmission in which frequent ground faults can occur which are caused by flashovers along the overhead line sections.

An operation with a low reactive power consumption advantageously results in fewer additional (for example switched) elements for reactive power compensation being required in comparison with a conventional line-commutated power converter. As a result, for example, savings can be made on outgoing feeder panels for reactive power compensation and/or a lower rated power for the reactive power compensation elements can be provided.

Furthermore, advantageously overvoltages in the case of load shedding, in particular in the case of load shedding in HVDC transmission, are reduced. Consequently, the devices can be designed for lower overvoltages, and the protection strategies in respect of overvoltage are simplified and therefore less expensive. By means of the arrangement and the method, thyristor-based power converters can also be operated on weak or very weak grids (for example in countries with a more weakly developed grid infrastructure), in which it has until now not been possible using conventional line-commutated thyristor power converters. Effective assistance in the commutation by the targeted injection of the voltage of modules, in particular of full-bridge modules, takes place. As a result, safe and reliable commutation in the thyristor-based power converters is achieved.

The invention claimed is:

1. A method for operating a thyristor-based line-commutated polyphase power converter at a polyphase AC-voltage connection point that is supplied power from an AC-voltage grid, the method comprising:
   providing a series circuit of modules in each phase between the AC-voltage connection point and an AC-voltage terminal of the power converter, each of the modules having a first electronic switching element, a second electronic switching element, and an electrical energy storage device;
   obtaining measured voltages by measuring voltages of the phases of the AC-voltage connection point; and
   in response to identifying a low voltage on a given phase of the AC-voltage connection point based on the measured voltages, generating with the series circuit of modules associated with the given phase an additional voltage for addition to the voltage of the given phase in order to increase the voltage of the given phase at least temporarily.

2. The method according to claim 1, wherein:
   the power converter has a plurality of phase branches; and the additional voltage is generated at least during the commutation of a current into that phase branch of the power converter that is associated with that phase.

3. The method according to claim 2, which comprises, after concluding the commutation of the current, discontinuing the addition of the additional voltage.

4. The method according to claim 1, wherein the step of generating the additional voltage comprises generating the additional voltage so that a sum of the voltage of the phase and the additional voltage has a segment of a sinusoidal voltage characteristic.

5. The method according to claim 1, which comprises generating a constant voltage as the additional voltage.

6. The method according to claim 1, which comprises generating the additional voltage such that the charging and discharging of the energy storage devices of the modules of the respective series circuit cancel one another out during a grid period.

7. The method according to claim 1, which comprises controlling a reactive power consumption of the power converter by way of the additional voltage such that, in a case of an increasing additional voltage, the reactive power consumption decreases, and, in a case of a decreasing additional voltage, the reactive power consumption increases.

8. The method according to claim 1, wherein the power converter has a three-phase bridge circuit comprising six phase branches.

9. The method according to claim 1, wherein the power converter is one of two power converters connected in series on a DC-voltage side, and wherein each of the two power converters has a 6-pulse bridge circuit.

10. The method according to claim 1, which comprises providing a transformer connected between the AC-voltage connection point and the AC-voltage terminal of the power converter, and arranging the at least one series circuit between the AC-voltage connection point and the transformer or between the transformer and the AC-voltage terminal of the power converter.

11. The method according to claim 1, wherein one or both of the following is true:
the modules of the series circuits have the first electronic switching element and the second electronic switching element connected in a half-bridge circuit;
each of the modules of the series circuits has a third electronic switching element and a fourth electronic switching element, and wherein the first electronic switching element, the second electronic switching element, the third electronic switching element, and the fourth electronic switching element are connected in a full-bridge circuit.

12. The method according to claim 11, which comprises:
with the first and second electronic switching elements of the series circuits of modules arranged in a half-bridge circuit, generating the additional voltage for each commutation by means of one of the series circuits in only one phase; or
with the first, second, third, and fourth electronic switching elements arranged in a full-bridge circuit, generating additional voltages for each commutation by means of the series circuits in at least two phases.

13. An arrangement with a thyristor-based line-commutated polyphase power converter having a polyphase AC-voltage terminal, wherein each phase of the AC-voltage terminal is connected via a respective series circuit of modules to a polyphase AC-voltage connection point for an AC-voltage grid, wherein each of the modules has a first electronic switching element, a second electronic switching element, and an electrical energy storage device, the arrangement further comprising:
a measuring device for obtaining a measured voltage by measuring a voltage present at the AC-voltage connection point; and
a control device connected to said measuring device and to said modules of said series circuit, said control device being configured, upon identification of a low voltage on a given phase of the AC-voltage connection point based on the measured voltage, to drive said series circuit of modules associated with the given phase to generate an additional voltage for addition to the voltage of the AC-voltage connection point to increase the voltage of the given phase at least temporarily.

14. The arrangement according to claim 13, wherein:
the power converter has a plurality of phase branches; and
said control device is configured to drive said modules of said series circuit in such a way that said modules generate the additional voltage at least during the commutation of a current into a phase branch of said power converter associated with the given phase.

15. The arrangement according to claim 14, wherein said control device is configured to drive said modules of said series circuit to disconnect the additional voltage after conclusion of the commutation of the current.

16. The arrangement according to claim 13, wherein said control device is configured to drive said modules of said series circuit such that a sum of the voltage of the given phase and the additional voltage has a segment of a sinusoidal voltage characteristic.

17. The arrangement according to claim 13, wherein said control device is configured to drive said modules of said series circuit to generate the additional voltage as a constant voltage.

18. The arrangement according to claim 13, wherein said control device is configured to drive said modules of said series circuit to control a reactive power consumption of said power converter by way of the additional voltage such that, in a case of an increasing additional voltage, the reactive power consumption decreases, and, in a case of a decreasing additional voltage, the reactive power consumption increases.

19. The arrangement according to claim 13, wherein:
said first electronic switching element and said second electronic switching element of said series circuits of modules are connected in a half-bridge circuit, said control device is configured to drive said modules of one of said series circuits in only one phase to generate the additional voltage for each commutation;
or
said modules of said series circuits of modules have said first electronic switching element, said second electronic switching element, a third electronic switching element, and a fourth electronic switching element arranged in a full-bridge circuit, and said control device is configured to drive said modules of two of said series circuits in two phases to generate an additional voltage for each commutation.

20. An arrangement, comprising:
a thyristor-based line-commutated polyphase power converter having a polyphase AC-voltage terminal, wherein each phase of the AC-voltage terminal is connected via a respective series circuit of modules to a polyphase AC-voltage connection point for an AC-voltage grid, wherein each of the modules has a first electronic switching element, a second electronic switching element, and an electrical energy storage device;

a measuring device for obtaining a measured voltage by measuring a voltage present at the AC-voltage connection point; and a control device connected to said measuring device and to said modules of said series circuit, said control device being configured, upon identification of a low voltage on a given phase of the AC-voltage connection point based on the measured voltage, to drive said series circuit of modules associated with the given phase to generate an additional voltage for addition to the voltage of the AC-voltage connection point to increase the voltage of the given phase at least temporarily.

* * * * *